Dec. 2, 1958 W. E. DOBBINS 2,863,054

LOGICAL GATE CORRECTING CIRCUIT

Filed Feb. 23, 1955

INVENTOR:
Willis E. Dobbins

Karl Beinst
Louis A Kline
John J. Matlago, Agent
Their Attorneys.

United States Patent Office 2,863,054

Patented Dec. 2, 1958

2,863,054

LOGICAL GATE CORRECTING CIRCUIT

Willis E. Dobbins, Manhattan Beach, Calif., assignor to The National Cash Register Company, Dayton, Ohio, a corporation of Maryland Application February 23, 1955, Serial No. 490,028

8 Claims. (Cl. 250—27)

This invention relates to electronic computer circuits and, more particularly, to a means and method for minimizing the effects of distributed capacity in high impedance pulse forming circuits.

The overall reliability of an electronic digital computer is largely dependent upon the generation and gating of precisely shaped waveforms with but a minimum of distortion. This requirement of electronic computers is particularly significant with respect to output signals from logical gates or networks, inasmuch as the voltage level of an output signal during the basic timing signal period of the computer controls the gating action that may be effected in other logical networks during that period. In other words, any transient associated with a change in level of an output signal from a network, as called for by a change in level of an input signal to the network at the end of the previous timing signal period, must be completed in some systems well within the first half of the current timing signal period, for example, in order to ensure reliable operation of the gating networks. Thus the limits of computational speed of a computer are determined largely by the speed with which the voltage levels of the outputs of the logical networks can change in response to changes in voltage levels at the inputs thereto.

One of the objects of this invention is, therefore, to provide means for increasing the computational speed at which digital logical circuits are capable of reliably operating.

It is another object of this invention to provide means for significantly reducing the effects of distributed or stray capacity within critical high impedance pulse forming circuits.

In designing such computer logical networks, as herein described, it is further desirable to use rather large load resistors in the logical network circuits so as to reduce the power requirements for driving these networks. However, using large load resistors also causes the networks to respond slowly to changes in the input signals because of the increased time constant resulting from this high resistance combined with the stray capacitance of the circuit arrangements.

It is, accordingly, another object of this invention to provide means for reducing power requirements of computer logical networks without sacrificing computational speed at which these circuits are capable of reliably operating.

Briefly, the circuit of the present invention provides for connecting the load resistor of a logical "or" network of an electronic digital computer to ground by way of the plate of an electron tubes whose cathode is connected to a voltage level below that to which these logical networks are normally connected. The control grid of this tube is connected by way of an inverter circuit to the source of timing signals used to synchronize and step the computer through its operations.

The operation of this circuit is such that any charge on the distributed capacitance arising within the logical networks is effectively reduced by supplying a current path for the series resistor of the logical network through this tube during the first half of a timing signal period, thus ensuring that any transients associated with changes in signal levels, called for at the end of the last timing signal period, are completed prior to the last half of the current timing signal period. It is to be noted that by connecting all load resistors of a plurality of logical "or" networks to the plate of this tube, only one such tube is required to reduce the effects of undesirable distributed capacitance associated with the operation of all of the logical networks.

A more complete understanding of this invention, as well as additional objects and features thereof, may be obtained by reference to the ensuing description of the drawings in which.

Figures 1, 2:
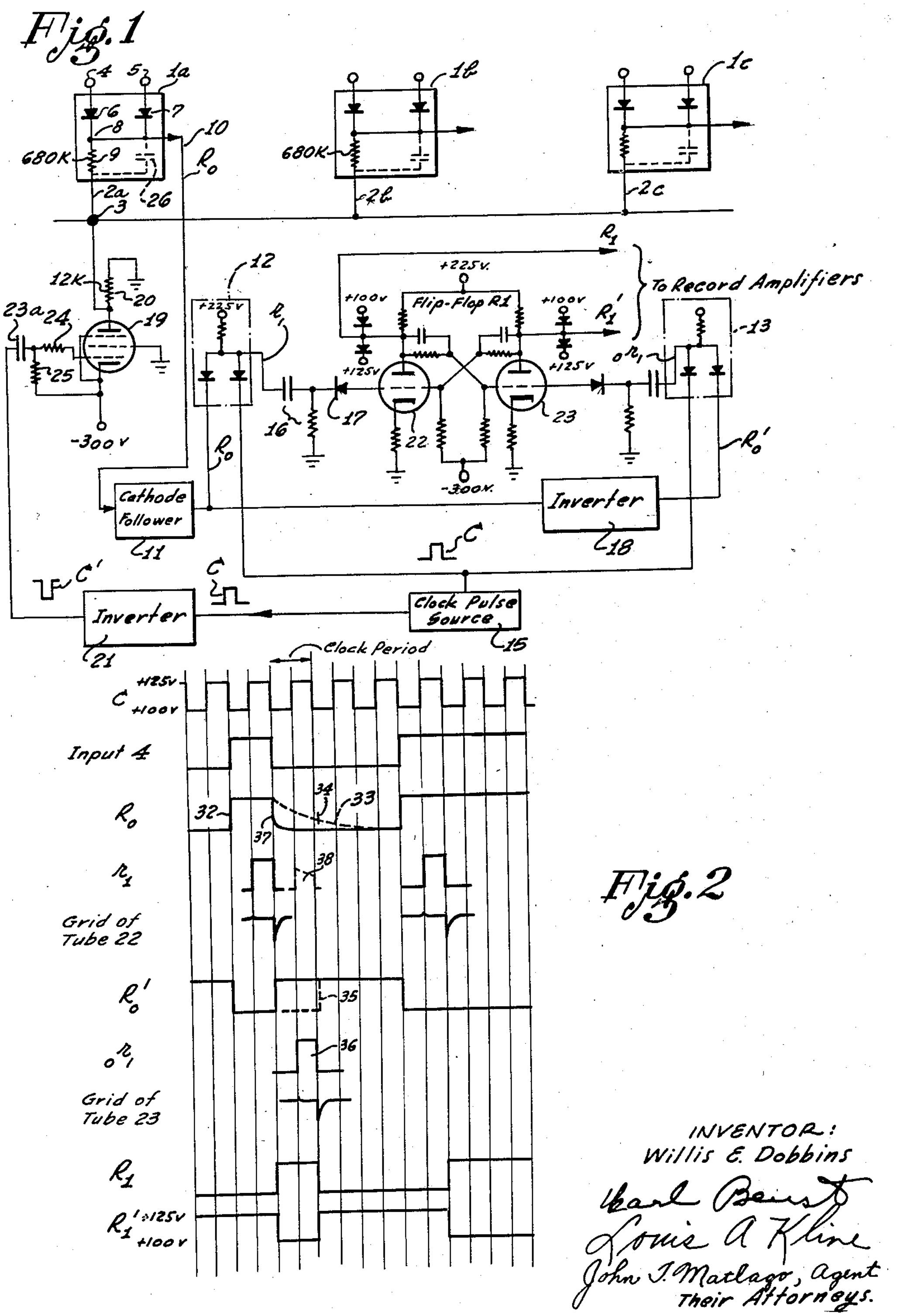
Fig. 1 is a schematic diagram of a preferred embodiment of the invention.
Fig. 2 is a timewise graph of voltage waveforms, useful in explaining the operation of the circuit shown in Fig. 1.

Referring to Fig. 1, a schematic diagram is shown of a preferred embodiment of the circuit of the present invention. The circuit includes a plurality of logical circuits, such as circuits 1*a*, 1*b* ,and 1*c*, each connected by way of a respective lead 2*a*, 2*b*, and 2*c* to a common junction 3. Each of these logical circuits, as shown in particular by circuit 1*a*, has a pair of inputs 4 and 5 connected to the anodes of respective crystal diodes 6 and 7, whose cathodes are joined to a junction 8 which is connected to common junction 3 through load resistor 9. Common junction 3 is returned to ground by way of resistor 20. Circuit 1*a* has an output 10 connected to junction 8. Each of the other logical circuits is similarly arranged with an output.

These logical circuits are typical "inclusive or" gates. For simplification, they are shown with but two inputs, i. e., 4 and 5, though it is understood that a greater number of inputs may be used if necessary. The diodes, such as 6 and 7, are so orientated that whenever a high voltage level signal, e. g., +125 v., is applied on either one or both inputs 4 and 5, output 10, connected to common junction 8, is at a high potential, e. g., +125 v., because of the voltage drop caused by current in the series connected resistors 9 and 20. When neither one of the inputs 4 or 5 is high in potential, output 10 is at a low operating potential, e. g., +100 v.

As an example of a typical arrangement for the output of a logical "or" circuit, output 10 is shown connected to the trigger inputs of a flip-flop R1 which, in effect, recreates on its outputs $R_1$ and $R_1'$, the signal on output 10, together with its complementary signal, such that this signal can be recorded by way of record amplifiers (not shown) onto the surface of a magnetic drum, for example. A signal on output 10, herein designated as $R_0$, is connected to cathode follower 11, and from thence to trigger input $r_1$ of flip-flop R1 by way of logical "and" gate 12. The output of cathode follower 11 is inverted in inverter 18 before being applied to input ${}_0r_1$ of flip-flop R1 by way of logical "and" gate 13. Clock signals C from clock pulse source 15 are connected to each of the logical "and" gates 12 and 13. These logical "and" gates, as is well understood in the prior art, only pass a high voltage signal onto the output thereof during the time both inputs are simultaneously at a high voltage operating level, e. g., +125 v. Each trigger input of flip-flop R1, such as the input to the grid of tube 22, includes a differentiator 16 and a clipping diode 17 therein, in a manner well known in the prior art.

It is to be understood that waveforms on outputs of the logical "or" networks 1*b* and 1*c* are utilized to drive circuits which are equally critical to a fast response of the output waveforms of the networks to changes on the input signals thereto. For simplicity, however, only one complete output circuit has been shown in Fig. 1.

The correction circuit of the present invention will next be described. This circuit comprises a high emission electron tube 19, e. g., a pentode type 5881, whose plate is connected to common junction 3. Tube 19 has its plate connected to ground by way of resistor 20, and has its cathode connected to a suitable bias, e. g., —300 volts. The suppressor grid of tube 19 is connected to the cathode thereof; the screen grid is connected to ground. Tube 19 is thus a triode-connected pentode.

Tube 19 has a train of inverted clock pulses C′ from clock inverter 21 applied to the control grid thereof by way of coupling capacitor 23*a* and limiting resistor 24. This control grid is connected to the —300 volt bias by way of resistor 25.

In order to obtain a complete understanding of the novelty and utility of the invention herein disclosed, the operation of the circuit in Fig. 1 will be discussed, assuming that tube 19 is not included in the circuit to correct for the effect of stray capacitance, which is represented by dotted capacitor 26 in circuit 1*a*.

As is well known in the electronic art, distributed capacity is defined as capacitance distributed between wires, between parts, and between conducting elements and ground, as distinguished from capacitance concentrated or lumped in a capacitor.

This operation of the circuit in Fig. 1 will be described with reference to the diagram of Fig. 2 wherein waveform C represents a train of clock pulses varying between +100 v. to +125 v. The next waveform represents a non-return-to-zero binary signal varying between +100 v. and +125 v. as applied to input 4 of circuit 1*a*. It is assumed, for purposes of this discussion, that input 5 has a steady state +100 volt input signal applied thereto. The solid lines of the logical gate output waveform $R_0$ are indicative of the shape thereof as achieved by utilization of the circuit of the present invention, whereas the dashed line portion 33 is indicative of deviation of the shape of the waveform $R_0$ when provision is not made for discharging the stray capacitance 26 associated with network 1*a*.

Referring to the operation of logical circuit 1*a* in Fig. 1, when either diode 6 or 7 (or both) is caused to suddenly conduct in the forward direction as a result of a sharp rise of the input signal to a high voltage level (+125 v.), the time constant of the rise in waveform on the output of circuit 1*a* is determined mainly by the magnitude of source impedance of input 4 (this is a small value) times the magnitude of distributed capacity 26. This results in rapid rise 32 in the waveform $R_0$ shown in Fig. 2. However, when the signal on input 4 sharply drops to the low voltage level (+100 v.), the time constant of the circuit is determined by the magnitude of resistor 9 times the magnitude of distributed capacity 26. It is to be noted that resistor 9 is preferably relatively large in order to curb the necessity of large current requirements for the logical networks. Consequently this time constant is substantially longer than that associated with a rise in voltage level at input 4, resulting in gradual fall 33 in the logical gate output waveform $R_0$, as shown in Fig. 2.

Thus, although the waveform $R_0$ on the gate output is seen to rise rapidly, as illustrated by rapid rise 32, the fall thereof is relatively slow, as illustrated by fall 33. As a result, when transient fall 33 is applied onto the grid of the tube comprising inverter 18, conduction in the tube is not cut off until the output voltage of waveform $R_0$ attains a threshold value 34, thus causing the inverter output waveform $R_0'$ to switch to a high voltage level as indicated by rise 35. The effect of such distortion is that it suppresses the passage of pulse 36 through "and" gate 13 onto the ${}_0r_1$ trigger input. As a result, flip-flop R1 is not triggered "false" at the proper time so as to recreate waveform $R_0$ and its complement $R_0'$ on outputs $R_1$ and $R_1'$, respectively.

Another example of how distortion 33 in the fall transient of waveform $R_0$ could result in unreliable operation of computer circuits is revealed by noting how this distortion results in the improper gating of a pulse 38. Thus, if the gating action for triggering a flip-flop were dependent on output $R_0$ during the clock period noted, a distortion in the waveform such as that shown by transient 33 would cause the flip-flop to trigger at an incorrect time. The problem solved by the invention herein disclosed is the effective and substantial reduction of this undesirable distortion in the waveform output from gate circuit 1.

In order to understand how the conduction status of electron tube 19 serves to discharge distributed capacity 26 of a typical logical "or" gate, such as gating circuit 1*a*, consideration should first be given as to how common junction 3 effectively serves as a variable voltage reference point. As explained previously, the voltage appearing on output 10 varies between +100 volts and +125 volts. A change in level of an input signal to the logical gate, such as the signal on input 4, occurs only at the fall of a clock pulse because all input signals to the logical gates are derived from flip-flops, or similar devices, whose status can only be changed at the fall of a clock pulse.

Inverted clock signal C′ is applied to the control grid of tube 19 by way of coupling capacitor 23*a*. The effect of this inverted signal C′ is to cut off tube 19 during the last half of the clock period because the control grid is then negative with respect to the cathode. However, when the inverted clock signal C′ is high in potential during the first half of a clock period, tube 19 conducts, because the control grid is then positive with respect to the cathode. It is during this time that the distributed capacitance represented by dotted capacitor 26 is discharged by means of the supplementary current path through tube 19. As a result, the waveform $R_0$ falls in accordance with transient 37, as shown in Fig. 2; thus its complementary signal $R_0'$ is enabled to rise at the proper time to gate pulse 36 through logical "and" gate 13 onto the ${}_0r_1$ trigger input of the R1 flip-flop. It should be understood that in accordance with the basic timing logic of these networks, it is only during the last half of a clock pulse period that the gating action of the logical networks is effective; thus the momentary reducing of the voltage at common junction 3 during the first half of the clock period (C′ high in potential) does not prevent an output from being at its proper voltage level status during the last half of a clock pulse period when the gating action of the logical networks is effective.

It is thus seen that tube 19 is cut off when the clock signal C is high in potential (+125 volts), and during this time the voltage at junction 3 is essentially at ground level. However, tube 19 conducts when the clock signal C is low in potential, and during this time junction 3 is at approximately —250 volts. Hence, by virtue of the supplementary current path offered by electron tube 19, the waveform $R_0$ does not fall along exponential curve 33 which approaches ground or zero level as an asymptote, but rather falls along exponential curve 37.

It should be noted that a similar arrangement could be provided for utilizing clock signals to rapidly charge the distributive capacity of a plurality of logical "and" gates, as required when the outputs of these "and" gates are connected to circuitry whose operation is critically dependent on sharp rises in the waveforms on these outputs. Thus a simple, effective solution is provided for the all-important problem of reducing waveform distortion in digital computer circuitry.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A pulse forming circuit comprising a plurality of logical gating networks each having a load, and an output connected to one end of the load to derive signals from across the load in response to input signals applied to the respective gating network; a common junction to which the other end of each of the gating network loads is connected; a driving circuit connected to said common junction; and a timing signal source providing an input for controlling said driving circuit, whereby said driving circuit periodically provides, in response to signals from said timing source, a supplementary current path for minimizing the effect of distributed capacity associated with said logical gating networks, thereby improving the shape of the signals on the outputs therefrom.

2. A pulse forming circuit comprising a clock pulse source; a plurality of diode gating networks each having a load and an output connected to one end of the load for deriving signals which are a function of input signals applied to the network in synchronism with the pulses of the clock pulse source; and an auxiliary circuit arrangement including an electronic tube, said tube having the other end of the load of each of said diode gating networks connected to the plate thereof, and said clock pulse source connected to the grid thereof, whereby said electronic tube periodically provides a supplementary current path for the distributed capacity of said diode gating circuits, and thereby improves the response of the outputs of said gating circuits to the binary input signals applied thereto.

3. A circuit of the class described comprising a plurality of logical "or" gates, each having an output and a load resistor; means for connecting the load resistor of each of said logical "or" gates to a common junction; an electron tube including at least a plate, a grid, and a cathode; a connection from said plate to said common junction and also to ground by way of a plate resistor; a connection from said cathode to a source of negative D. C. potential; and a source of timing pulses coupled to said grid for periodically causing said tube to conduct, whereby the voltage at said common junction is essentially at ground level during part of a timing pulse period and at a substantially lower potential during the remainder of the timing pulse period.

4. A signal shaping circuit arrangement including a plurality of logical "or" gates, each including a plurality of input diodes, an output, and a load resistor; means connecting the load resistors of each of said logical "or" gates to a common junction; and an electron tube including at least a plate, a grid, and a cathode, said plate being connected to said common junction and to ground by way of a resistor, said cathode being connected to a negative voltage point, and said grid being connected to a source of timing signals, whereby the voltage at said common junction periodically changes from a high to a low voltage in response to said timing signals, thereby creating a sharp fall on the signals generated on the outputs of said gates.

5. In combination, a plurality of logical "or" gates, each including a load resistor and having an output for signals derived by the respective gate from input signals applied to the gate; a source of timing signals operating synchronously with the input signals to the gates; means connecting the load resistors of said logical "or" gates to a common junction; an electron tube, including at least a plate, a grid, and a cathode; a plate resistor; a connection from said plate to said common junction and also to ground by way of said plate resistor; a negative voltage supply connected to said cathode; means for inverting said timing signals; and means for applying said inverted timing signals to the grid of said tube, whereby the voltage at said junction is essentially at ground level when said tube is cut off and essentially at the level of said negative voltage supply when said tube conducts, thereby providing a periodic discharge path for any distributed capacity associated with said logical "or" gates.

6. In combination, a logical "or" gate having a plurality of input diodes, a load resistor, and an output; a source of timing signals; an inverter circuit responsive to said source of timing signals and having an output; and an electronic tube including a plate, a grid, and a cathode, said plate being connected to said load resistor and to ground, said cathode being connected to a negative voltage source, and said grid being connected to the output of said inverter circuit, whereby in response to said inverted timing signals said tube operates to periodically connect said load resistor to said negative voltage source, thereby providing a supplementary current path for discharging stray capacitance associated with the output of said gate.

7. An electronic computer circuit comprising a logical gating circuit having a load device and a plurality of inputs and an output means deriving signal potentials from across the load device and across which load device stray capacitance exists which undesirably increases the time of response of the output means to a change of potential; a timing signal source effective to provide clock pulses; and means connected to and rendered active by said timing signal source to periodically connect a source of negative potential to discharge said stray capacitance, whereby to improve the response of the output means to said change of potential.

8. A circuit according to claim 7, said means comprising an electron tube circuit having a cathode and anode circuit connected to discharge said stray capacitance.

References Cited in the file of this patent

UNITED STATES PATENTS

| | | |
|---|---|---|
| 2,570,225 | Felker | Oct. 9, 1951 |
| 2,693,907 | Tootill | Nov. 9, 1954 |
| 2,762,936 | Forrest | Sept. 11, 1956 |